Nov. 22, 1966   R. C. ECKENFELDER ETAL   3,287,622
STATIC FREQUENCY CONVERTER FOR PRODUCING
A CONSTANT OUTPUT FREQUENCY FROM
A VARIABLE FREQUENCY INPUT
Filed June 14, 1963   4 Sheets-Sheet 1
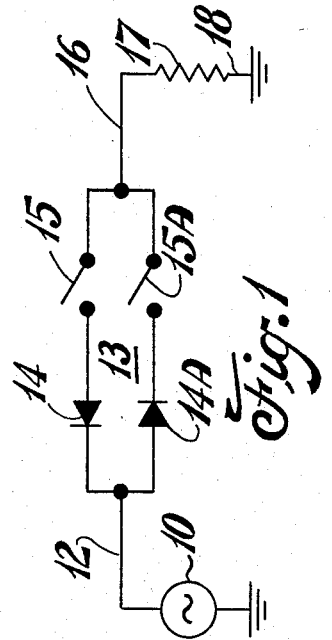
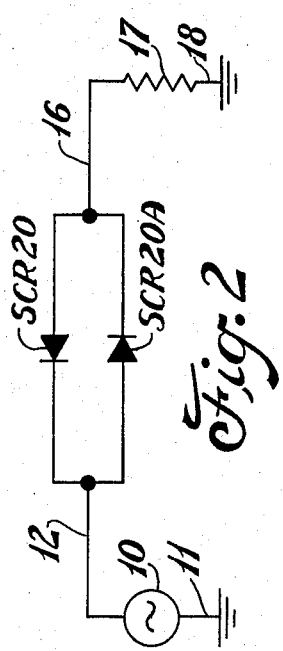
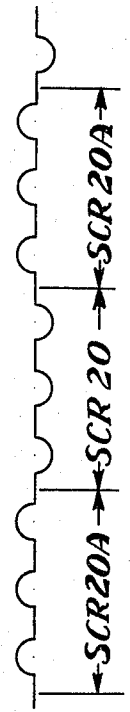
INVENTORS
ROBERT C. ECKENFELDER
LEO B. BOURGEAULT
BY
ATTORNEY

INVENTORS
ROBERT C. ECKENFELDER
LEO B. BOURGEAULT
BY

ATTORNEY

Nov. 22, 1966  R. C. ECKENFELDER ETAL  3,287,622
STATIC FREQUENCY CONVERTER FOR PRODUCING
A CONSTANT OUTPUT FREQUENCY FROM
A VARIABLE FREQUENCY INPUT

Filed June 14, 1963  4 Sheets-Sheet 3

INVENTORS
ROBERT C. ECKENFELDER
LEO B. BOURGEAULT
BY
ATTORNEY

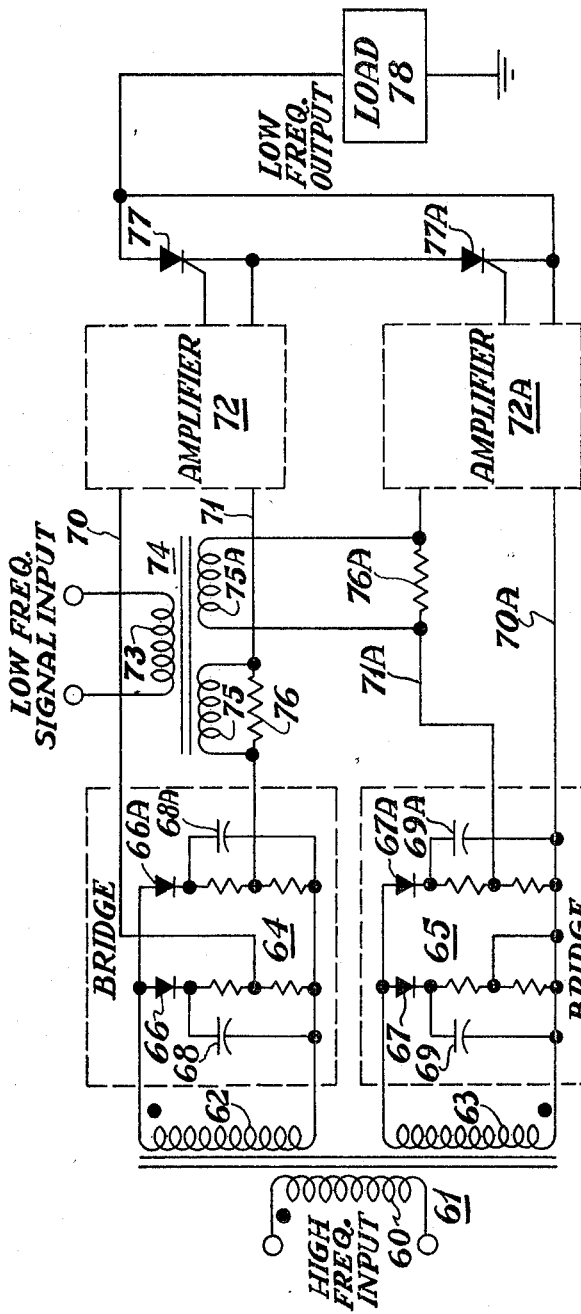

United States Patent Office 3,287,622
Patented Nov. 22, 1966

3,287,622
STATIC FREQUENCY CONVERTER FOR PRODUCING A CONSTANT OUTPUT FREQUENCY FROM A VARIABLE FREQUENCY INPUT
Robert C. Eckenfelder, Point Pleasant, and Leo B. Bourgeault, Spring Lake Heights, N.J., assignors to The Bendix Corporation, Eatontown, N.J., a corporation of Delaware
Filed June 14, 1963, Ser. No. 287,813
4 Claims. (Cl. 321—69)

The present invention relates to electrical apparatus and more particularly to a variable speed constant frequency generator.

In certain applications it is desirable to obtain a constant output frequency from an A.C. generator that is driven from a variable speed source. In the past various methods have been tried, such, for example, as inserting a constant speed drive between the variable speed source and the generator. Such an arrangement is not only complicated but requires constant maintenance and complicated controls. Also in the case of aircraft, the additional weight is objectionable.

The present invention provides a constant frequency output by converting a variable high frequency input into a lower constant frequency output by utilizing controlled rectifiers to alternate between positive rectification and negative rectification in accordance with a lower constant frequency.

It is an object of the invention to provide novel means for converting a variable frequency input to a constant frequency output.

Another object of the invention is to provide a novel variable speed constant frequency generator.

Another object of the invention is to provide a novel frequency converter.

Another object of the invention is to provide a constant low frequency output from a variable high frequency input.

Another object of the invention is to provide a single phase low frequency output from a multiphase input.

The above and other objects and features of the invention will appear more fully hereinafter from a consideration of the following description taken in conjunction with the accompanying drawings wherein various embodiments are illustrated by way of example.

In the drawings:

FIGURE 1 is a simplified schematic diagram to illustrate the principle of the invention.

FIGURES 1A, 1B and 1C are waveforms produced by the apparatus illustrated in FIGURE 1.

FIGURE 2 is a further evolvement of the apparatus of FIGURE 1.

FIGURE 2A illustrates the mode of operation of the apparatus of FIGURE 2.

FIGURE 5 illustrates a preferred mode of operation of the invention.

FIGURE 6 is a simplified schematic diagram of an embodiment adapted to operate in the preferred mode.

Figure 3:
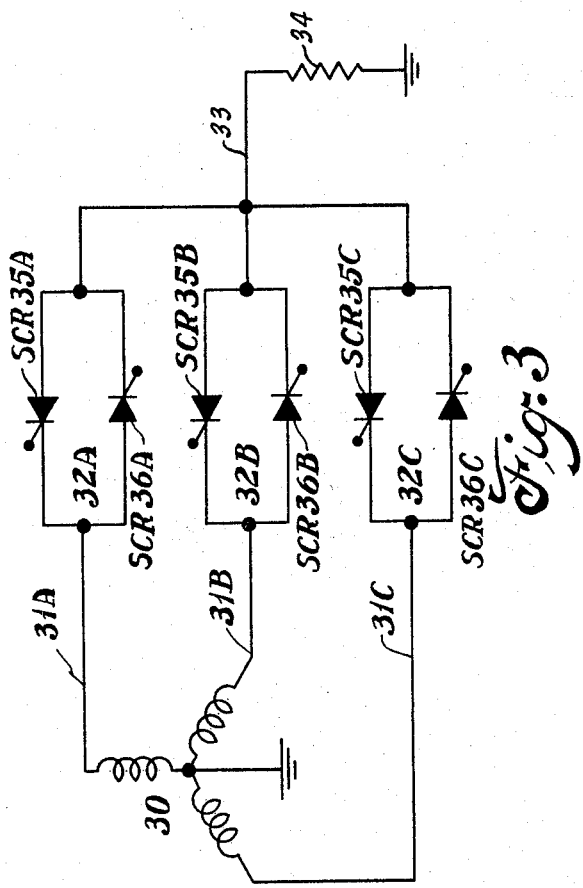
FIGURE 3 is a simplified schematic diagram of a three phase input embodiment of the invention.

In order to explain the invention, reference is now made to FIGURES 1, 1A, 1B and 1C of the drawings. In FIGURE 1 a high frequency generator is indicated generally by the numeral 10. The generator 10 has one output terminal connected by a conductor 11 to ground. The other output terminal is connected by a conductor 12 to a parallel circuit 13. The circuit 13 has rectifiers 14, 14A and switches 15, 15A in the respective legs thereof. The circuit 13 is connected by a conductor 16 to one side of a suitable load 17, illustrated as a resistor. The other side of the load 17 is connected by a conductor 18 to ground. While a grounded system is shown, it is understood that it is only for purposes of illustration and that an ungrounded system would be just as applicable. With the switch 15 closed and the switch 15A opened, the rectifier 14 is poled so that the output voltage across the load 17 would be the negative halves of the sine waves as shown in FIGURE 1A. With the switch 15A closed and switch 15 open the rectifier 15A is connected so that the output voltage across the load 17 would be the positive halves of sine waves as shown in FIGURE 1B. By periodically opening and closing the switches 15 and 15A, the output voltage across the load 17 would alternate between positive and negative rectification as illustrated in FIGURE 1C.

To further develop the aforenoted into a more practical device, the rectifiers 14, 14A and switches 15, 15A are replaced with silicon controlled rectifiers (SCR's) 20, 21 as illustrated in FIGURE 2. By providing a low frequency gating signal to the SCR's 20 and 21 an output waveform will be as shown in FIGURE 2A. In this arrangement first one SCR is turned on, then it is turned off and the other SCR turned on as the gating signal goes from positive to negative.

Figure 3A:
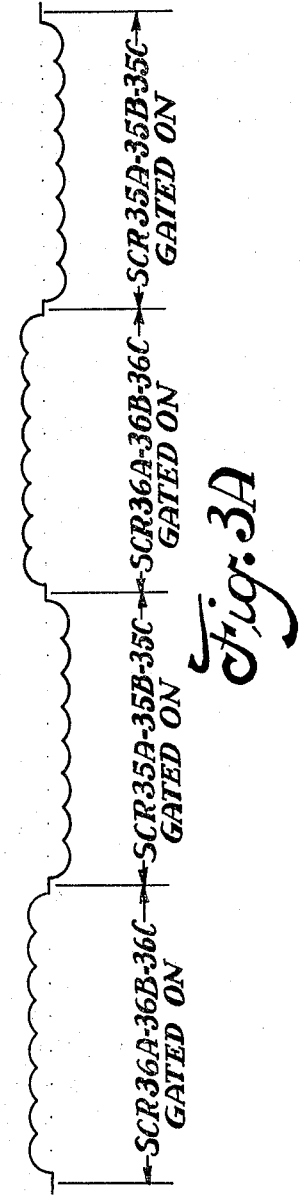
FIGURE 3A illustrates the operation of FIGURE 3.

The aforenoted described converting a high frequency single phase to a low frequency single phase. However, in order to maintain a balanced load on the high frequency machine, regardless of the imbalance on the low frequency output, also to improve the output wave shape, each phase of the output is made up from all three phases of the high frequency input phases. Referring now to FIGURE 3, a three phase high frequency generator is indicated generally by the numeral 30 and has the output thereof connected by conductors 31A, 31B and 31C to one side parallel circuits 32A, 32B and 32C. The other side of the parallel circuits 32A, 32B and 32C are connected by a conductor 33 to a suitable load 34. The parallel circuits 32A, 32B and 32C have SCR's 35A, 35B and 35C respectively in one leg thereof and SCR's 36A, 36B and 36C in the other legs thereof. By applying a low frequency single phase gating signal to the SCR's, FIGURE 3A illustrates the output waveform.

Figure 4:
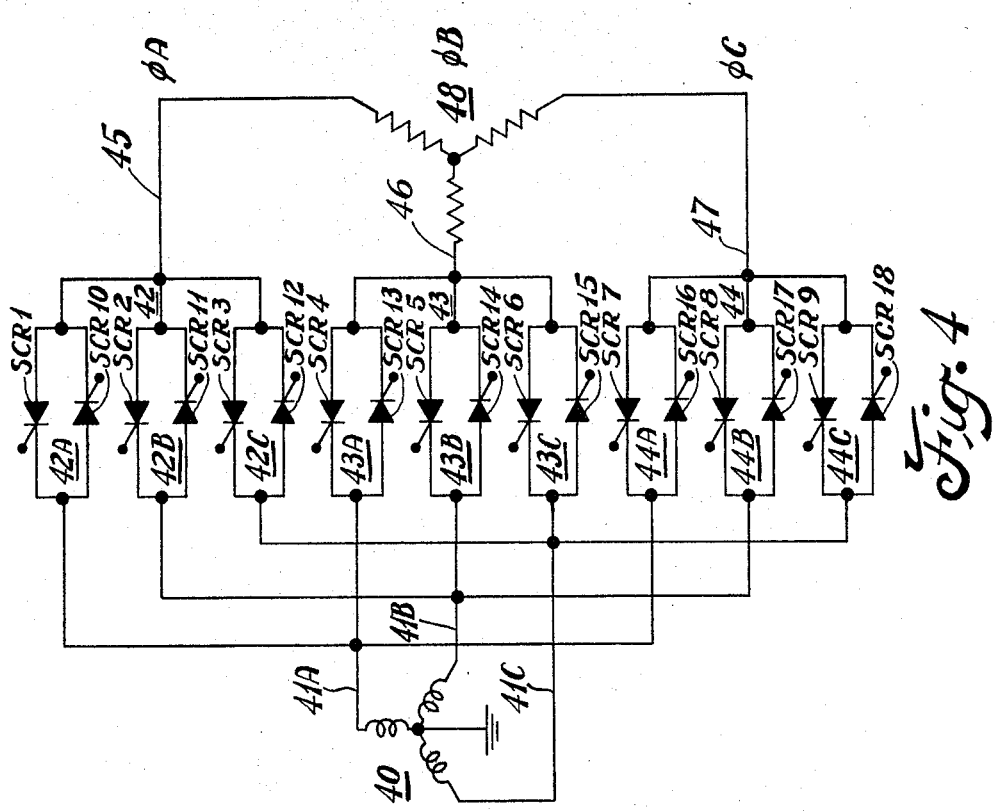
FIGURE 4 is a simplified schematic diagram of a three phase input, three phase output embodiment of the invention.
Figure 4A:
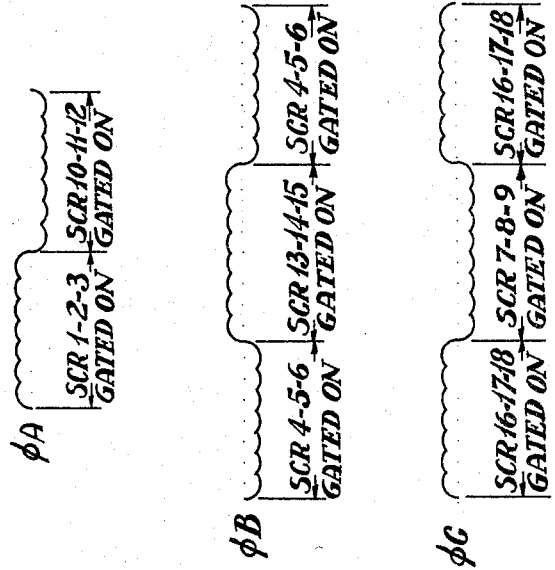
FIGURE 4A are waveforms produced by the device of FIGURE 4.

To extend the aforenoted to a three phase high frequency to three phase low frequency system, it is necessary to add two more phases on the output as is illustrated in FIGURE 4. A three phase high frequency generator is indicated generally by numeral 40 and has output conductors 41A, 41B and 41C. The conductor 41A is connected to input of parallel circuits 42A, 43A and 44A. The conductor 41B is connected to input of parallel circuits 42B, 43B and 44B and the conductor 41C is connected to input of parallel circuits 42C, 43C and 44C. The outputs of the parallel circuits 42, 43 and 44 are connected by respective conductors 45, 46 and 47 to a suitable load 48. With the addition of the two phases to the output, one of the phases is gated 120° ahead of the original phase and the other phase gated 120° behind the original phase. This gating arrangement is illustrated in FIGURE 4A and is obtained by the use of a low frequency three phase gating signal.

The aforenoted illustrates a simplified system and it would appear that SCR's 1, 2 and 3 in FIGURE 4 could be gated on simultaneously and that the gate signal could remain during the entire negative portion of the output on phase A. However, to leave the gate signal on when a SCR has reverse polarity, the leakage current is greatly increased. This would result in an increase in the power dissipated in the device. In order to reduce the power dissipated in the SCR's, the energy is concentrated towards the center of the wave by means of pulse width modulation as is illustrated by FIGURE 5. Also the harmonic content is reduced. This leads to the gate signals appearing as sequential pulses in step with the high frequency input. Further, pulse width modulation may be used in conjunction with a feedback system to maintain regulation with increasing load as well as to minimize harmonic content.

In order to provide pulse width modulation, reference is now made to FIGURE 6, in which for the purpose of simplification only the first single phase input to single phase output is illustrated. A high frequency input is connected across a primary winding 60 of a transformer 61. The transformer 61 has secondary winding 62 and secondary winding 63 which is of opposite polarity to the winding 62. The windings 62 and 63 are connected to the inputs of bridges 64 and 65 respectively. Each of the bridges 64 and 65 are comprised of two parallel half wave rectified circuits 66, 66A, 67, 67A and parallel RC loads 68, 68A, 69, 69A of different time constants. The output of the bridge is the difference of two decaying exponentials which approximate a saw-tooth waveform. The output of the bridge 64 is connected by conductors 70 and 71 to the input of an amplifier 72, in like manner, the output of the bridge 65 is connected by conductors 70A and 71A to the input of an amplifier 72A. The high frequency saw-tooth waveform is only a portion of the input to the amplifiers 72 and 72A. A low frequency modulating signal is connected across primary winding 73 of transformer 74. The transformer 74 has a winding 75 connected across a resistor 76 in the conductor 71 and another winding 75A connected across a resistor 76A in the conductor 71A. The amplifiers 72 and 72A being operated in a switching mode at the high frequency rate, produces an output pulse for turning on SCR's 77 and 77A respectively, the output of which is connected to load 78. The pulse width duration is dependent on the input saw-tooth waveform which is modulated at the low frequency rate. Thus a bridge and amplifier form one-half cycle of the low frequency output. This explains the reasons for the two opposite phased secondary windings on both the high frequency input and on the modulating signal transformers.

To extend the aforenoted from a single phase input/single phase output to three phase input/single phase output, two additional circuits identical to the one illustrated would be required. The modulating signals for the two additional phases would be obtained from four additional secondary windings wound on the original modulating signal transformer. All of the SCR outputs would be common to the load.

To go one step farther and construct a three phase output would require six additional circuits than that described for a one phase output. In addition, a three phase modulating signal would be necessary. In other words the control circuitry required for a three phase output would be three times that necessary for a single phase output.

In the system described, there are six SCR's per phase of low frequency output, each of which passes load current for substantially sixty electrical degrees, or in other words, works a duty cycle of one sixth. Roughly, this means that the low frequency phase current may be six times the R.M.S. current rating of the SCR's if the peak rating is not exceeded.

The low frequency modulating signal may be from an oscillator or any other source that provides the desired frequency output.

Although several embodiments of the invention have been illustrated and described, various changes in the form and relative arrangement of the parts, which will now appear to those skilled in the art, may be made without departing from the scope of the invention.

What is claimed is:

1. Apparatus for converting a high frequency input to a low frequency output, comprising a high frequency input, a low frequency output, means including two substantially similar parallel circuits connected to said input by a transformer having opposed secondary windings for connecting said input to said output, said circuits each including a bridge circuit of two parallel half-wave rectifier circuits with parallel RC loads of different time constants and having a saw-tooth wave from output, an amplifier having an input connected to the output of said bridge circuit and an output connected through a SCR to said low frequency output, and means including a modulating signal transformer having opposed secondary windings for connecting said modulating signal to said parallel circuits to turn on said SCR's in accordance with said signal.

2. A static frequency converter for converting a high frequency input to a low frequency output, comprising a source of high frequency, a low frequency output, a pair of substantially similar parallel circuits, each of said parallel circuits including a bridge circuit having a saw-toothed output, means for connecting said parallel circuits to said source of high frequency in opposite polarity, SCR's connecting said parallel circuit to said low frequency output, and means for connecting a low frequency modulating signal to said circuits in opposite polarity to modulate said saw-toothed output to turn on said SCR's alternately in accordance with said low frequency modulating signal.

3. The combination as set forth in claim 2 and including a three phase high frequency input and two additional circuits as set forth for the two additional phases.

4. The combination as set forth in claim 3 in which the control circuitry is three times that of claim 3 and the modulating signal is three phase to provide a three phase output.

References Cited by the Examiner
UNITED STATES PATENTS

| | | | |
|---|---|---|---|
| 2,967,252 | 1/1961 | Blake | 321—61 X |
| 3,152,297 | 10/1964 | Peaslee | 321—69 X |
| 3,170,107 | 2/1965 | Jessee | 321—69 X |
| 3,195,038 | 7/1965 | Fry | 323—25 |

OTHER REFERENCES

"Parallel Operation of Aircraft Alternaters Using Electronic Frequency Changers," by Bowlus and Nims; AIEE Transactions, vol. 66, 1947; pages 31–38.

JOHN F. COUCH, *Primary Examiner.*

G. GOLDBERG, *Assistant Examiner.*